United States Patent [19]

Ohta et al.

[11] Patent Number: 4,658,393
[45] Date of Patent: Apr. 14, 1987

[54] OPTICAL MEMORY DISC

[75] Inventors: Kenji Ohta, Yao; Akira Takahashi; Tetsuya Inui, both of Nara; Takao Hyuga, Soraku; Hideyoshi Yamaoka, Matsubara, all of Japan

[73] Assignee: Sharp Kabushiki Kaisha, Osaka, Japan

[21] Appl. No.: 671,865

[22] Filed: Nov. 15, 1984

[30] Foreign Application Priority Data

Nov. 17, 1983 [JP] Japan .......................... 58-178224[U]

[51] Int. Cl.$^4$ ........................... G11B 3/70; G11B 7/24
[52] U.S. Cl. ..................................... 369/290; 369/284; 369/286
[58] Field of Search ......................... 369/284, 286, 290

[56] References Cited

U.S. PATENT DOCUMENTS 1,885,415 11/1932 Collison ............................... 369/290
2,654,816 10/1953 Miessner ............................. 369/284
4,111,430 9/1978 Johnson ................................ 369/63
4,470,137 9/1984 Tago ..................................... 369/290
4,480,282 10/1984 Brock et al. ......................... 369/290

Primary Examiner—Steven L. Stephan
Attorney, Agent, or Firm—Birch, Stewart, Kolasch & Birch

[57] ABSTRACT

An optical memory disc includes a glass substrate on which a plurality of concentric circular guide grooves (or a spiral groove) are formed for tracking purposes. A centering plate is secured to the glass substrate in a manner that the center of a circular opening formed in the centering plate is exactly adjusted to the center of the plurality of concentric circular guide grooves (spiral groove). The circular opening formed in the centering plate is utilized to drive the optical memory disc on a turntable. Since the circular opening is not formed directly in the glass substrate, the center adjustment is easily conducted, and there is no possibility that the glass substrate is damaged when the circular opening is formed.

6 Claims, 5 Drawing Figures

OPTICAL MEMORY DISC

BACKGROUND OF THE INVENTION

1. Field of the Invention

The present invention relates to an optical memory disc, to which a laser beam is impinged to record, read out or erase information onto or from the optical memory disc.

2. Description of the Prior Art

Recently, an optical memory system has been developed, which optically stores information in high density and in mass storage order. In the optical memory system of the add-on-memory type or the erasable memory type, guide signals or guide addresses are normally recorded on the optical memory disc along concentric circular guide grooves or a spiral guide groove so as to control the optical beam position. In order to ensure an accurate operation, the concentricity of the circular guide grooves (spiral groove) and a rotation center of the optical memory disc must be maintained at a high accuracy. If the rotation center of the optical memory disc is displaced from the center of the circular guide grooves (spiral groove), the tracking operation becomes difficult because of the whirling.

In the conventional optical memory disc, a circular opening is formed in the optical memory disc at the center thereof, and the optical memory disc is driven to rotate while the circular opening is coupled to the spindle of a turntable of an optical memory system. The concentricity adjustment is difficult to control because the circular opening is formed directly in the optical memory disc. Furthermore, there is a possibility that the optical memory disc is damaged when the circular opening is formed in the substrate of the optical memory disc.

OBJECTS AND SUMMARY OF THE INVENTION

Objects of the Invention

Accordingly, an object of the present invention is to provide an optical memory disc of a novel construction.

Another object of the present invention is to enhance the concentricity of the circular guide grooves (spiral groove) and the rotation center of an optical memory disc of the add-on-memory type or the erasable memory type.

Still another object of the present invention is to simplify the manufacturing method of an optical memory disc.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, a centering plate is secured to the optical memory disc, the centering plate having a circular opening formed at the center portion thereof. The centering plate is secured to the optical memory disc so that the circular opening formed in the centering plate is correctly positioned at the center of the circular guide grooves (spiral groove) formed in the optical memory disc. That is, the circular opening is not formed in the optical memory disc, but is formed in the centering plate which is secured to the optical memory disc. Since the circular opening is not directly formed in the optical memory disc, namely, in the substrate of the optical memory disc, there is no possibility that any deterioration is formed in the substrate such as a glass substrate.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
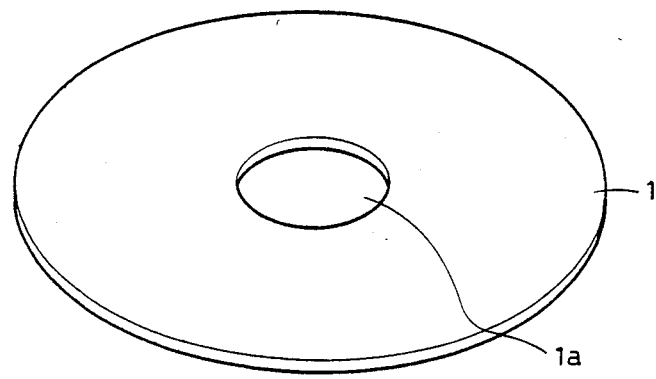
FIG. 1 is a perspective view of an optical memory disc of the prior art.

FIG. 1 shows the general construction of the conventional optical memory disc. The conventional optical memory disc 1 includes a transparent substrate. A recording thin-film layer is formed on one major surface of the transparent substrate. A circular opening 1a is formed in the optical memory disc 1 at the center thereof.

Figure 2:
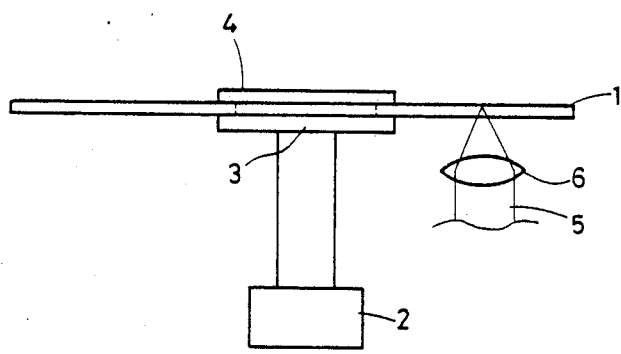
FIG. 2 is a schematic front view of an optical memory disc playback apparatus suited for the optical memory disc of FIG. 1.

The optical memory disc 1 is set on an optical memory disc playback apparatus as shown in FIG. 2 for recording/reproducing information onto/from the optical memory disc 1. The optical memory disc playback apparatus includes a motor 2, and a disc support table 3 connected to the motor 2. The disc support table 3 has the circular projected portion at the center thereof so that the circular projected portion is fitted into the circular opening 1a formed in the optical memory disc 1. After the optical memory disc 1 is disposed on the disc support table 3, the optical memory disc 1 is tightly secured to the disc support table 3 through the use of a depression member 4. Under the condition where the optical memory disc 1 is tightly secured to the disc support table 3, the motor 2 is rotated to rotate the optical memory disc 1. A laser beam 5 is impinged on a desired portion of the optical memory disc 1 through the use of a condenser lens 6 so as to record/reproduce information onto/from the optical memory disc 1.

Figure 3:
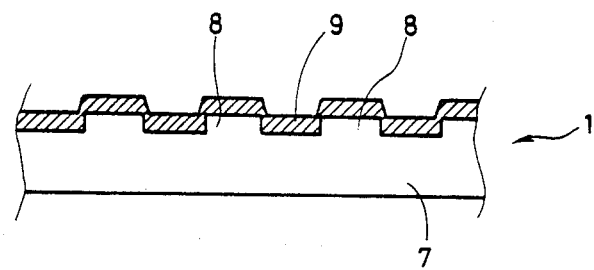
FIG. 3 is a sectional view showing a portion of an optical memory disc associated with the present invention.

FIG. 3 is an enlarged sectional view showing a part of the optical memory disc 1. The optical memory disc 1 includes a glass substrate 7 having a plurality of concentric circular guide grooves 8 formed on one major surface thereof. A recording thin-film layer 9 is formed on the concentric circular guide grooves 8. The concentric circular guide grooves 8 are important in the add-on-memory type which has the recording thin-film layer made of, for example, $TeO_x$, or in the erasable memory type which has the recording thin-film layer made of, for example, an amorphous alloy thin-film comprising a rare earth metal and a transition metal. The concentric circular guide grooves are generally formed with a pitch of 1.4 through 3 μm, and each groove generally has a width of 0.7 through 1 μm, and a depth of 500 through 800 Å. A spiral groove can be formed on the glass substrate 7 instead of the concentric circular guide grooves 8.

The laser spot for recording, reproducing or erasing purposes is applied to a desired portion on the optical memory disc 1 with reference to the concentric circular guide grooves 8 (the spiral groove). The tracking operation becomes difficult if the rotation center, namely the circular opening 1a is not accurately adjusted to the center of the concentric circular guide grooves 8 (the spiral groove) formed in the optical memory disc 1. More specifically, the displacement between the rotation center and the center of the concentric circular grooves 8 (the spiral groove) must be smaller than several tens microns to ensure a stable tracking operation. However, in the conventional optical memory disc, it is difficult to accurately adjust the center of the circular opening 1a to the center of the concentric circular guide grooves 8 (the spiral groove) because the circular opening 1a is formed directly in the optical memory disc 1. Furthermore, there is a possibility that the glass substrate 7 is damaged when the circular opening 1a is formed in the glass substrate 7.

Figure 4:
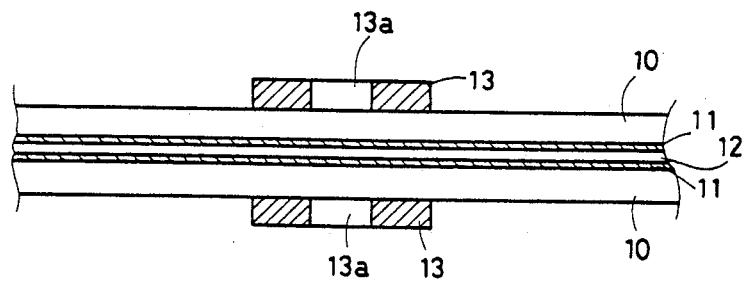
FIG. 4 is a sectional view of an essential part of an embodiment of an optical memory disc of the present invention.

FIG. 4 shows an essential part of an embodiment of an optical memory disc of the present invention. A pair of solid glass substrates 10 are provided. The circular opening is not formed in the glass subsrates 10. A plurality of concentric circular guide grooves (or a spiral groove) are formed on each of the confronting surfaces of the glass substrates 10. A recording thin-film layer 11 is formed on each of the concentric circular grooves (spiral groove) formed on the glass substrates 10. The pair of memory discs are attached to each other through the use of an adhesive 12 in a manner that the recording thin-film layers 11 confront each other. A pair of centering plates 13 are disposed on the surfaces of the attached glass substrates 10, and the positions of the centering plates 13 are correctly adjusted while the attached optical memory disc is rotated so that circular openings 13a formed in the centering plates 13 are exactly located at the center of the concentric guide grooves (spiral groove) formed on the pair of glass substrates 10.

Figure 5:
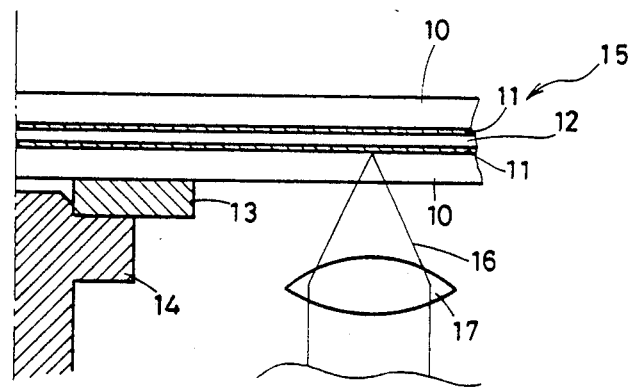
FIG. 5 is a sectional view of an essential part of a manufacturing apparatus for manufacturing the optical memory disc of FIG. 4.

FIG. 5 shows an apparatus for securing the centering plates 13 to the glass substrates 10. A centering plate 13 is disposed on a turntable 14, and an optical memory disc 15 including the pair of glass substrates 10 is disposed on the centering plate 13. While the turntable 14, the centering plate 13 and the optical memory disc 15 are rotated, an observing beam 16 is applied to the optical memory disc 15 through an objective lens 17 in order to observe the concentric circular guide grooves (spiral groove) formed on the glass substrates 10. The position of the optical memory disc 15 is adjusted on the centering plate 13 so that the concentric circular guide grooves (spiral groove) do not shift even when the optical memory disc 15 is rotated. Then, the centering plate 13 is secured to the glass substrate 10. The displacement between the center of the centering plate 13 and the center of the concentric circular guide grooves (spiral groove) is determined only by the displacement between the center of the centering plate 13 and the center of the turntable 14. Thus, the displacement can be easily controlled below 10 μm. The centering plate 13 can be an acrylic resin (PMMA) plate to which the surface hardening is conducted. The centering plate 13 can alternatively be a stainless steel plate or a Cu plate to which the surface treatment is conducted. In the forgoing embodiment, the both-side optical memory disc is discussed. However, the present invention is also effective to a single side optical memory disc.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical memory disc comprising:
   a substrate without a center hole therein;
   a plurality of concentric circular guide grooves formed on said substrate;
   a recording thin-film layer formed on said plurality of concentric circular guide grooves; and
   a centering plate secured to said substrate, said centering plate having a hole, the center of which is adjusted to the center of said plurality of concentric circular guide grooves, said centering plate being the sole means of centering said disc to facilitate reading thereof.

2. An optical memory disc comprising:
   a substrate without a center hole therein;
   a spiral guide groove formed on said substrate;
   a recording thin-film layer formed on said spiral groove; and
   a centering plate secured to said substrate, said centering plate having a hole formed therein at a position corresponding to the center of said spiral groove, said centering plate being the sole means of centering said disc to facilitate reading thereof.

3. A method of defining the center of an optical memory disc which is rotatable about said center to facilitate reading thereof, said memory disc including a plurality of concentric circular information storage tracks, said method comprising:
   mounting a centering plate having a central circular hole on a rotatable spindle, said circular hole being centered on the rotational axis of said spindle,
   supporting said optical disc on said centering plate;
   rotating said spindle, centering plate and optical disc;
   monitoring at least one of said concentric circular information tracks;
   moving said disc with respect to said centering plate until the center of said at least one of said concentric circular information tracks corresponds to the rotational axis of said spindle to center said centering plate with respect to said disc; and
   bonding said centering plate to said disc when centered with respect thereto.

4. The method of claim 3 wherein a hole through said disc is not used to determine the center of said disc.

5. A method of defining the center of an optical memory disc which is rotatable about said center to facilitate the reading thereof, said memory disc having at least one spiral information storage track, said method comprising:
   mounting a centering plate having a central circular hole on a rotatable spindle, said circular hole being centered on the rotational axis of said spindle;

supporting said optical disc on said centering plate;
rotating said spindle, centering plate and optical disc;
monitoring said at least one spiral information storage track;
moving said disc with respect to said centering plate until the center of said at least one spiral information storage track corresponds to the rotational axis of said spindle to center said centering plate with respect to said disc; and
bonding said centering plate to said disc when centered with respect thereto.

6. The method of claim 5 wherein a hole through said disc is not used to determine the center of said disc.

* * * * *